Patented Apr. 15, 1952

2,593,128

UNITED STATES PATENT OFFICE 2,593,128

PROCESS FOR SULFURIC ACID RECOVERY

Richard H. Felter, Oakland, Calif., assignor to California Research Corporation, San Francisco, Calif., a corporation of Delaware No Drawing. Application May 6, 1948,
Serial No. 25,531

10 Claims. (Cl. 23—173)

The present invention relates to a process for the recovery of sulfuric acid from sulfuric acid sludges formed during the refining of petroleum and, more particularly, to its separation from sludges having a high acid content, a high acid-to-water ratio, and a low viscosity.

The employment of sulfuric acid as a refining agent and as a catalyst in various processes for the production of marketable oils and fuels from petroleum distillates is well known. The problem of economically disposing of the sulfuric acid sludges formed during such processes is likewise well known. A very considerable research effort has been expended on this problem over a period of years, and, while various methods have been developed for disposing of these sludges, the problem continues to receive attention. Sulfuric acid is used in the petroleum industry for a number of different specific refining purposes in which different temperatures, concentrations of acid, and acid-to-charge ratios are employed and, accordingly, there are produced in these processes sludges which differ greatly in composition and properties. It has been found that methods suitable for the recovery of acid from, and disposal of, one type of sludge may be ill-suited to the treatment of other sludges.

Sludges are commonly treated either by digesting with water and steam to separate an acid layer and a tar layer, the acid layer being concentrated and tar layer burned, or by heating without water to reduce the acid to sulfur dioxide which is recovered and reconverted to sulfuric acid.

These methods require, in one case, costly concentration of the dilute acid phase if useful acid is to be recovered, and in the other, a heavy outlay in equipment if the sludge is to be thermally decomposed and the resulting sulfur dioxide converted to sulfuric acid. Large refineries frequently find it economical to utilize sludges of high acid content in pretreating or treating other stocks whereby the acid is further degraded to a level where recovery of acid by one of the above-indicated methods of sludge treatment or disposal without recovery of the acid values are the only known procedures available. Small refineries may avoid such a process as sulfuric acid alkylation because they are unable to utilize the spent alkylation acid in further treating and/or are unable to make an economical recovery of the acid for further use.

It is an object of the present invention to provide a method for the direct recovery of concentrated sulfuric acid from high acid sludges of the character above and hereinafter described without recourse to a step of concentrating a dilute recovered acid and without recourse to a step of reduction to sulfur dioxide followed by conversion to sulfuric acid.

Other objects will be apparent in the following disclosure.

It has now been discovered that concentrated sulfuric acid may be separated from certain types of sulfuric acid sludges which are characterized by a high acid content, a high acid-to-water ratio and a low viscosity, by cooling to a temperature below about 30° F. to crystallize concentrated sulfuric acid, and thereafter separating the crystals from the carbonaceous mother liquor. Sludges of this type may be obtained in treating naphthas, cracked gasolines, white oils, and as the spent acid from a sulfuric acid alkylation process. The acid content of such sludges is commonly in the range 80–90% by weight, their $H_2SO_4/H_2O$ mol ratio is commonly about 5, and their viscosity at 10° F. is commonly so low that the liquid phase remains quite fluid. Substantial recovery of sulfuric acid at high concentration may be made from sludges of this character by the crystallization process of the present invention.

Typical results obtained by the process of the invention in treating acid spent in sulfuric acid alkylation are summarized in the following Table I. The particular acids treated in the runs summarized in Table I were spent in the alkylation of olefins with isoparaffins to prepare alkylates boiling predominantly in the gasoline boiling range. Acid spent in other alkylation processes as in the alkylation of aromatic hydrocarbons may be similarly treated to recover sulfuric acid. The acid crystals in each of the runs summarized were separated from the mother liquor or carbonaceous phase by centrifugal filtration.

*Table I*

| Run | Per cent $H_2SO_4$ | Per cent C [1] | Centrifuging | | Recovered Acid | | | | Carbonaceous Phase | | | |
|---|---|---|---|---|---|---|---|---|---|---|---|---|
| | | | Temp. °F. | Time Min. | Per cent $H_2SO_4$ | Per cent C | Yield wt. per cent of charge | Yield wt. per cent of acid in charge | Per cent $H_2SO_4$ | Per cent C | Weight per cent of charge | Weight per cent of acid in charge |
| 26 | 93.5 | 3.3 | 10 | 20 | 98.2 | 0.8 | 34 | 36 | 90.4 | 4.8 | 66 | 64 |
| 27 | 93.4 | 3.3 | 0 | 20 | 97.1 | 1.9 | 49 | 51 | 89.7 | | 51 | 49 |
| 28 | 93.2 | 3.3 | 5 | 60 | 98.2 | 0.6 | 44.5 | 47 | 90.0 | | 55.5 | 53 |
| 30 | 93.0 | 3.3 | 10 | 30 | 98.0 | 0.6 | 44.5 | 47 | 89.0 | | 55.5 | 53 |
| 33 | 92.7 | 3.3 | 5 | 45 | 99.0 | 0.4 | 48.5 | 52 | 87.0 | 5.8 | 51.5 | 48 |
| 36 | 93.0 | 3.7 | 10 | 60 | 99.2 | 0.3 | 40 | 43 | 88.2 | 5.3 | 60 | 57 |

[1] Carbon as determined by quantitative chemical oxidation of carbonaceous material to $CO_2$ and measurement of the $CO_2$ evolved.

In runs 27-30, inclusive, the spent acid was cooled in an Erlenmeyer flask in contact with an alcohol-carbon dioxide bath at −35° F. to centrifuging temperature with agitation of the acid during cooling. In runs 33 and 36, cooling was by radiation into still cold air at −20° F.

furic acid is added to the carbonaceous mother liquor recovered by filtration and the mixture is cooled and crystallized as in the first step.

The following Table II summarizes results obtained in employing fuming sulfuric acid to increase yield by both of the above methods.

*Table II*

| Run | Per cent $H_2SO_4$ | Per cent C[1] | Centrifuging | | Recovered Acid | | | | Carbonaceous Phase | | | |
|---|---|---|---|---|---|---|---|---|---|---|---|---|
| | | | Temp. °F. | Time Min. | Per cent $H_2SO_4$ | Per cent C | Yield wt. per cent of charge | Yield wt. per cent of acid in charge | Per cent $H_2SO_4$ | Per cent C | Weight per cent of charge | Weight per cent of acid in charge |
| 89 | 94.3 | 3.3 | 18 | 60 | 99.5 | 0.4 | 68 | 72 | 81.7 | 9.7 | 32 | 28 |
| 94 | 95.2 | 3.1 | 20 | 60 | 99.7 | 0.2 | 65.5 | 69 | 85.3 | 8.2 | 34.5 | 31 |
| 64 | 91.9 | 3.8 | −10 | 60 | 97.7 | 1.2 | 49 | 52 | 87.2 | 5.9 | 51 | 48 |

[1] Carbon as determined by quantitative chemical oxidation of carbonaceous material to $CO_2$ and measurement of the $CO_2$ evolved.

without agitation. The cooling time in these latter two runs was approximately 100 minutes, or about ten times that in runs 27-30, inclusive; larger crystals were formed and the recovered acid was improved both as to yield and quality. Cooling under conditions which give large crystals is accordingly preferred.

A eutectic mixture of sulfuric acid and water is known which contains 93% $H_2SO_4$ and 7% $H_2O$ by weight; this mixture freezes at −35° F. In the practice of the present invention, it is preferred to treat sludges and spent acids in which the acid-to-water ratio is higher than the 93:7 ratio of the eutectic. At higher ratios of sulfuric acid to water, it is possible to crystallize sulfuric acid of higher acid concentration than that of the eutectic at a temperature substantially above the eutectic temperature.

This crystallization has been found to occur at temperatures in the range of 0-30° F., and preferably 10-20° F., which makes the employment of extreme low temperature unnecessary. Further, it is found that separation of crystal and liquid phases may readily be made in these temperature ranges, but that the employment of lower temperature is attended by viscosity increases which make the separation difficult or impossible.

Spent alkylation acid and sludges formed in refining gasoline and naphtha with sulfuric acid commonly have an acid-to-water ratio of composition higher than that of the above eutectic composition.

It has been found that acid recovery from sludges of the character above described may be markedly increased by the employment of either fuming sulfuric acid or sulfur trioxide in the process.

In one method of employing these substances to increase yield, they are added to the sludge prior to cooling and filtering. The water content of the sludge does not ordinarily exceed about 4% by weight and a substantial portion of this water will combine with the added sulfur trioxide or fuming sulfuric acid. The volume of acid residue having or approaching the 93% $H_2SO_4$-7% $H_2O$ eutetic composition is substantially reduced and net acid recovered from the sludge is increased.

In a second method of employing sulfur-trioxide and fuming sulfuric acid in the process of the invention, two crystallization steps are conducted. In the first step, the sludge is crystallized in the manner summarized in Table I, and, in a second step, sulfur trioxide or fuming sul- In runs 89 and 94, the spent alkylation acid of run 33, Table I, was fortified by adding 17% of its weight of 15-fuming sulfuric acid which was equivalent to adding 4% by weight of $SO_3$. Run 89 of Table II shows the recovery of 72% by weight of the acid including the fortifying acid at 18° F. as 99.5% sulfuric acid crystals. Subtracting the fuming sulfuric acid added, a net yield of 65% of the acid content of the spent acid charge, prior to fortification, was obtained, the recovered acid being at a concentration of 99.5% by weight $H_2SO_4$.

Run 94 is a substantial duplication of the result of run 89, the fuming acid being added to the spent acid in equal amounts in both runs.

In run 64 of Table II the carbonaceous phase recovered in runs 33 and 36 of Table I was fortified by the addition of one part of 15-fuming sulfuric acid to 3 parts of the carbonaceous phase material and crystallized. The 52% yield of acid charged shown in Table II represents a 31% recovery of the acid of unfortified carbonaceous phase. The two steps as represented by runs 33 and 36, Table I, and run 64, Table II, make a total yield of above 63% of the acid content of the original spent acid at a concentration of 98% $H_2SO_4$ by weight.

In the employment of fuming sulfuric acid or sulfur trioxide by either of the above methods, the number of mols of $SO_3$ added either as sulfur trioxide or as the sulfur trioxide excess over 100% $H_2SO_4$ in the fuming acid will in no case exceed the number of mols of water in the sludge or spent acid or in the carbonaceous filtrate of a first crystallization step, as the case may be. Most efficient acid recovery is obtained when the mol ratio of added $SO_3$ to water in the charge is below about 0.5.

The sulfuric acid recovered by the process of the invention in any of the above described modifications has a high concentration approaching 100% $H_2SO_4$ and is of high purity. Close examination of the filtered crystals shows them to be substantially pure sulfuric acid coated with a layer of residual carbonaceous liquor. The carbonaceous liquid adhering to the crystals after centrifugal filtration amounts to about 6% to 7% by weight of the crystal mass and this adhering liquor is the source of the small per cent of carbon in the recovered acid reported in Tables I and II.

Where suction filtering or decantation and draining are employed in making the crystal-liquor separation, the quantity of liquor contained in the crystal mass separated by these methods is substantially greater, amounting to as much as 45% by weight of the mass. The superiority of centrifugal filtration over these other methods is evident.

The small carbon content of the recovered acid shown in Tables I and II has little effect on the usefulness of the recovered acid in petroleum treating processes. However, the quantity of carbonaceous mother liquor adhering to the crystals, and therefore the carbon content of the recovered acid, may be substantially reduced by washing the crystals with small quantities of clean concentrated sulfuric acid. The temperature of the acid employed in such washing is at or just above its melting point so that the washing will cause no appreciable melting of the crystals. If the acid wash is employed, product quality is improved but the net recovery of sulfuric acid is decreased.

It has been found that the efficiency of the acid recovery in the process of this invention is increased if the sludge or spent acid charge is passed directly or without appreciable aging from the petroleum treating process in which it is formed to the acid recovery process. Such sludges and spent acids undergo changes on standing or aging which render them less amenable to separation by the process of this invention. For example, spent acids of the type shown as the charge in Tables I and II on standing show a decrese in titratable acidity, in free acid content, and in recoverable acid, while their water content and sulfur dioxide content increase. These changes may be due in part to oxidation of the carbonaceous material by sulfuric acid with the formation of sulfur dioxide and water. Whatever the explanation, the changes are positive and of sufficient magnitude to adversely effect the separation by crystallization. The increase in water content is especially undesirable since it causes an increase in the amount of the 93% $H_2SO_4$—7% $H_2O$ eutectic acid which is separated from the crystallized acid by filtration.

I claim:

1. The method of treating sulfuric acid sludges formed in the treatment of petroleum fractions with concentrated sulfuric acid and characterized by a sulfuric acid content above about 80% by weight and by a weight ratio of sulfuric acid to water above 93:7 which comprises cooling the sludge to a temperature between about 0° F. and 30° F. to produce a solid phase comprising concentrated sulfuric acid having a concentration greater than 93 per cent and a liquid phase and thereafter separating the phases.

2. The method of treating sludges formed during the treatment of petroleum fractions with concentrated sulfuric acid and characterized by a high sulfuric acid content above about 80% by weight and by a high weight ratio of sulfuric acid to water above 93:7 which comprises cooling the sludge to a temperature between about 0° F. and 30° F. to produce a solid phase comprising concentrated sulfuric acid having a concentration greater than 93 per cent and a liquid phase and separating the phases by suction filtration.

3. The method of recovering sulfuric acid from wastes formed in petroleum refining, said wastes comprising sulfuric acid, water and carbonaceous material and having a high acid content above about 80% by weight and a mol ratio of $H_2SO_4$ to $H_2O$ above about 2.5 which comprises cooling the waste to a temperature between about 0° F. and 30° F. to produce a solid phase comprising concentrated sulfuric acid having a concentration greater than 93 per cent and a liquid phase and separating the phases by centrifugal filtration.

4. The method as defined in claim 3, wherein the sulfuric acid waste is spent sulfuric acid from a process of sulfuric acid alkylation.

5. The method as defined in claim 3, wherein the waste is a sludge formed during the treatment of petroleum naphtha concentrated sulfuric acid.

6. The method as defined in claim 3, wherein the waste is a sludge formed in the refining of white oils with concentrated sulfuric acid.

7. The method of recovering sulfuric acid from wastes formed in petroleum refining, said wastes comprising sulfuric acid, water and carbonaceous material and having a high acid content above about 80% by weight and a mol ratio of $H_2SO_4$ to $H_2O$ above about 2.5 which comprises adding to said wastes a material selected from the class consisting of fuming sulfuric acid and sulfur trioxide in amount sufficient to substantially reduce the water content of said wastes, cooling the mixture to a temperature between about 0° F. and 30° F. to produce a solid phase comprising concentrated sulfuric acid having a concentration greater than 93 per cent and a liquid phase and thereafter separating the phases.

8. The method as defined in claim 7, wherein the mol ratio of sulfur trioxide contained in the added material to water contained in the waste is below about 0.5.

9. The method of recovering sulfuric acid from petroleum refinery wastes comprising sulfuric acid, water, and carbonaceous material and having a high sulfuric acid content above about 80% by weight and a mol ratio of $H_2SO_4$ to $H_2O$ above about 2.5 which comprises cooling the waste to a temperature between about 0° F. and 30° F. to produce a solid phase comprising concentrated sulfuric acid having a concentration greater than 93 per cent and a liquid phase, separating the phases by centrifugal filtration, adding to the filtrate a material selected from the class consisting of fuming sulfuric acid and sulfur trioxide in amount sufficient to substantially reduce the water content of said filtrate, cooling the resulting mixture to a temperature between about 0° F. and 30° F. to produce a solid phase comprising concentrated sulfuric acid and a liquid phase and separating the phases by centrifugal filtration.

10. The method of recovering concentrated sulfuric acid from spent sulfuric acid from a process of sulfuric acid alkylation which comprises cooling the spent acid to a temperature between about 0° F. and 30° F. to produce a solid phase consisting essentially of concentrated sulfuric acid having a concentration greater than 93 per cent and a carbonaceous liquid phase, separating the phases by centrifugal filtration and washing the separated solid phase with cold concentrated sulfuric acid to remove residual carbonaceous liquid.

RICHARD H. FELTER.

(References on following page)

REFERENCES CITED

The following references are of record in the file of this patent:

UNITED STATES PATENTS

| Number | Name | Date |
|---|---|---|
| 230,171 | Bower | July 20, 1880 |
| 1,988,768 | Aldridge | Jan. 23, 1935 |
| 2,287,732 | Frey | June 23, 1942 |

FOREIGN PATENTS

| Number | Country | Date |
|---|---|---|
| 96 | Great Britain | Jan. 8, 1883 |
| 4,430 | Great Britain | Mar. 24, 1887 |
| 546,670 | Great Britain | July 24, 1942 |